United States Patent [19]

Rupp

[11] Patent Number: 4,611,423
[45] Date of Patent: Sep. 16, 1986

[54] OUTRIGGER CLIPS

[76] Inventor: Herbert E. Rupp, 4761 Anchor Ave., Port Salerno, Fla. 33492

[21] Appl. No.: 780,040

[22] Filed: Sep. 26, 1985

[51] Int. Cl.$^4$ .................................................. A01K 91/00
[52] U.S. Cl. .................................................. 43/43.12
[58] Field of Search .............................. 43/43.12, 27.4

[56] References Cited

U.S. PATENT DOCUMENTS

| | | | |
|---|---|---|---|
| Re. 25,650 | 10/1964 | Strumpf | 43/43.12 |
| 2,749,648 | 6/1956 | Schneider | 43/43.12 |
| 2,925,682 | 2/1960 | Kravitch | 43/43.12 |
| 4,069,611 | 1/1978 | Dusich | 43/43.12 |
| 4,428,142 | 1/1984 | Shedd | 43/43.12 |
| 4,430,823 | 2/1984 | Henze | 43/43.12 |
| 4,453,336 | 1/1984 | Lowden | 43/43.12 |

*Primary Examiner*—Gene P. Crosby
*Attorney, Agent, or Firm*—Carroll F. Palmer

[57] ABSTRACT

An outrigger clip for releasably holding a fishing line in trolling position astern a fishing boat has an elongated body with fastener members on each end for supporting the clip outboard of the boat on outrigger lines. A V-shaped roller over which the fishing line may freely run during trolling is rotatably retained on a shaft that extends laterally from a gate hinged on the midsection of the body about a pivot axis substantially parallel to the longitudinal axis of the body so the roller may swing between a closed, fishing line holding position and an opened, release position. A lug extends from the same side of the gate as the shaft at an acute angle. Detent members frictionally engage such lug when the roller is in the holding position and there are springs adjustably compressed in longitudinal bores in the body to apply pressure on the detent members for regulating the holding force applied to the lug to control the pull required to release the fishing line from the clip when a fish strikes.

14 Claims, 8 Drawing Figures

U.S. Patent  Sep. 16, 1986  4,611,423
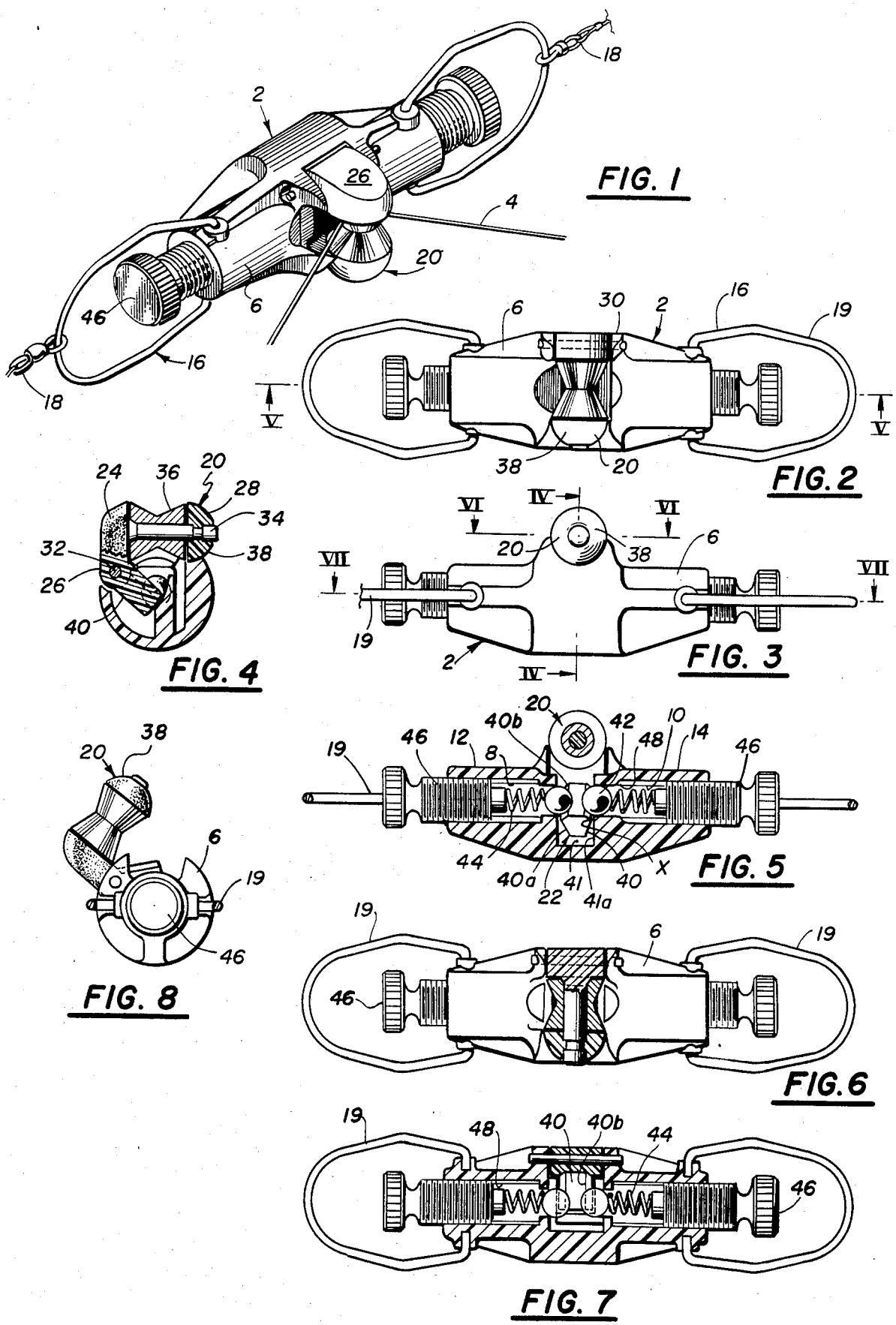

OUTRIGGER CLIPS

BACKGROUND OF THE INVENTION

1. Field of the Invention

This invention relates broadly to fishing equipment. More particularly, it concerns outrigger clips for holding fishing lines in trolling position astern a fishing boat and automatically releasing the lines when a fish strikes.

2. Description of the Prior Art

In sportsfishing operations, particularly offshore, one conventional procedure is to simultaneously troll a number of fishing lines astern the fishing boat from outriggers that are positioned outboard of the boat. Special devices are used in such operations to releasably hold the fishing line in trolling position until a fish strikes, at which time the clip is intended to allow the line to drop from the outrigger system and run directly from the fishing pole and reel to the fish. This invention provides unique improvements in the construction, functioning and efficiency of such devices, which are generically referred to herein as "outrigger clips".

In sportsfishing trolling, the fishing line conventionally passes from the fishing rod on the boat to the outrigger clip and thence astern the boat. While the clip is held on outrigger lines outboard of the boat, the fishing line must be capable of moving fore or aft through the clip to permit the distance between the bait and boat to be adjusted or to make other adjustments. Accordingly, outrigger clips can tend to fray, snag or sever the fishing line. Often, this does not occur or become apparent until a fish strikes the bait, much to the aggravation of the fishing party. Roller arrangements have been developed to mitigate these problems in the use of outrigger clips as shown, for example, by U.S. Pat. Nos. 3,905,148 and 4,428,142.

A number of other demands are made on outrigger clips if they are to perform satisfactorily to the expectations of demanding sportsfishermen. For example, the clips must assume and maintain a good fairlead position on the outrigger lines throughout the trolling operation, even in rough sea conditions, i.e., they should not tend to twist so as to bind or snag the fishing line. Also, they should hold the line with a reliable, controlled amount of tension and automatically release the line as soon as that tension is exceeded. Further, since balance on a tossing boat in rough seas can be difficult, truly satisfactory outrigger clips should be capable of one-hand opening and closing for setting the fishing line between catches or the like. Finally, all of these features need to be embodied in a rugged, lightweight and corrosion resistant device.

Substantial prior work has been done, in addition to developing the roller arrangements mentioned above, for the purpose of providing improved outrigger clips as shown by the following U.S. patents:

U.S. Pat. Nos. Re. 25,650; 2,925,682; 3,081,575; 2,749,648; 2,958,973; 3,919,801.

The present invention provides still further improvements in construction and operation of outrigger clips to fulfill expectations of sportsfishermen for such fishing hardware.

OBJECTS

A principal object of the invention is provision of new improvements in sportsfishing equipment.

Further objects include the provision of:

1. Improved forms of outrigger clips for holding fishing lines in trolling position astern a fishing boat and automatically releasing the lines when a fish strikes.
2. Outrigger clips capable of one-hand manipulation.
3. Outrigger clips that maintain a consistent fairlead position on the outrigger lines even in rough sea conditions.
4. Outrigger clips that permit fishing lines to be freely held thereby without being snagged, frayed or otherwise damaged.

Other objects and further scope of applicability of the present invention will become apparent from the detailed description given hereinafter; it should be understood, however, that the detailed description, while indicating preferred embodiments of the invention, is given by way of illustration only, since various changes and modifications within the spirit and scope of the invention will become apparent to those skilled in the art from this detailed description.

SUMMARY OF THE INVENTION

The objects are accomplished, in part, in accordance with the invention by the provision of outrigger clips that comprise an elongated body with fastener members on each end for supporting the clip outboard of the boat on outrigger lines, e.g., bails pivoted on each end of the body.

A V-shaped roller over which the fishing line may freely run during trolling is rotatably retained on a shaft that extends laterally from a gate hinged on the midsection of the clip body about a pivot axis substantially parallel to the longitudinal axis of the body so the roller may swing between a closed, fishing line holding position and an opened, release position.

A lug extends from the same side of the gate as the shaft at an acute angle. Detent members, e.g., spring biased balls, frictionally engage such lug when the roller is in the holding position and there are springs adjustably compressed in longitudinal bores in the body to apply pressure on the detent members for regulating the holding force applied to the lug to control the pull required to release the fishing line from the clip when a fish strikes.

In preferred embodiments, there is a cavity in clip body which the lug enters when the roller is in the holding position and the cavity has a pair of opposed sidewalls defined by the blind ends of the longitudinal bores in the clip body. Also, the detent members consist of balls captured in the blind ends with a portion only of each ball extending through its respective sidewall into the cavity and screws members are threaded into the longitudinal bores by which the springs are compressed against the balls.

Additionally in preferred embodiments, the lug has a cross-section defined in part by a pair of plane first surfaces and a pair of plane second surfaces with the first surfaces being longer than the second surfaces. One of the first surfaces intersects one of said second surfaces at a predetermined angle x and the other of the first surfaces intersects the other of the second surfaces at the same angle. The first surfaces define between themselves an angle y and angle x is advantageously greater than angle y.

The balls ride up the first surfaces as the roller swings from the releasing position to the holding position and then forceably engage the second surfaces when the roller is in the holding position.

BRIEF DESCRIPTION OF THE DRAWINGS

A more complete understanding of the invention may be had by reference to the accompanying drawings in which:

FIG. 1 is an isometric view of an outrigger clip of the invention shown attached to outrigger lines and holding a fishing line for trolling astern a fishing boat.

FIG. 2 is a plan view of the outrigger clip.

FIG. 3 is a lateral view of the outrigger clip.

FIG. 4 is a sectional view taken on the line IV—IV of FIG. 3.

FIG. 5 is a sectional view taken on the line V—V of FIG. 2.

FIG. 6 is a sectional view taken on the line VI—VI of FIG. 3.

FIG. 7 is a sectional view taken on the line VII—VII of FIG. 3.

FIG. 8 is an end view of the outrigger clip with the V-shaped roller in the opened, line release position.

DESCRIPTION OF THE PREFERRED EMBODIMENTS

Referring in detail to the drawings, in which identical parts are identically marked, the invention provides new forms of outrigger clips 2 for releasably holding a fishing line 4 in trolling position astern a fishing boat (not shown).

The new clips 2 comprise an elongated body 6 having blind longitudinal bores 8 & 10 extending respectively through ends 12 & 14 thereof.

Fastener means 16 are provided on each of the body ends 12 & 14 for supporting the outrigger clip outboard of the boat on outrigger lines 18. Preferably, the fastener means 16 are bails 19 pivoted on each end of the body 6.

Roller means 20 over which the fishing line 4 may freely run for holding in the trolling position cooperates with tension means 22 for controlling the releasing of the the line 4 upon strike of the bait by a fish.

The roller means 20 comprises a gate portion 24 having a hinged end 26 and an unhinged end 28. The hinged end 26 is pivoted on the midsection 30 of the body 6 about a pivot pin 32 positioned on a longitudinal axis substantially parallel to the longitudinal axis of the body 6 to permit the roller means 20 to swing between a fishing line holding position (see FIG. 4) and a fishing line release position (see FIG. 8).

In the roller means 20, a shaft 34 extends from the outboard, unhinged end 28 normal to the axis of pin 32, and a V-shaped roller 36 is rotatably retained on the shaft 34, such as by the cap 38 which is press fitted to the outboard end of shaft 34.

The roller means 20 also comprises a lug 40 that extends from the same side of the gate portion 24 as the shaft 34 and at an an acute angle relative to the hinged end 26 and the shaft 34. There is a cavity 41 in the body 6 which the lug 40 enters when the roller means 20 is in the holding position. The cavity 41 has a pair of opposed sidewalls 41a defined by the blind ends of the bores 8 & 10.

In the preferred embodiments, the lug 40 is integral with the gate portion 26 and it has a cross-section defined in part by a pair of plane first surfaces 40a and a pair of plane second surfaces 40b, the first surfaces 40a being longer than the second surfaces 40b. One of the first surfaces 40a intersects one of the second surfaces 40b at a predetermined angle x and the other of the first surfaces 40a intersects the other second surface 40b at the angle x, while the first surfaces 40a define between them an angle y. The angle x is greater than the angle y (not designated on the drawing).

The tension means 22 comprises detent members 42 to frictionally engage the lug 40 when the roller means 20 is in the line holding position as shown in FIGS. 1 & 4. Springs 44 are held in each of the longitudinal bores 8 & 10 to apply a biasing force on the detent members 42 and screw members 46 screwed into the threads 48 in the bores 8 & 10 allow the magnitude of the biasing force applied by the springs 44 to be controlled.

Advantageously, the detent members 42 consists of balls captured in the blind ends of the bores 8 & 10 with a portion only of each ball extending through its respective sidewall 41a into the cavity 41.

The second surfaces 40b of the lug 40 engage the balls when the roller means is in the holding position, such surface engagement providing predetermined force for releasably retaining the roller means 20 in the line holding position. On the other hand, the first surfaces 40a momentarily engage the balls as the roller means 6 swings from the releasing position (FIG. 8) to the holding position (FIG. 4).

The new outrigger clips 2 of the invention provide a number of improvements over related prior known clips. For example, the clips 2 can be manipulated by one hand which is a distinct advantage in rough seas. Thus, while the clip body 6 is held in one hand by the user's finger, the roller means 20 can be flipped to the opened position (FIG. 8) from the closed position (FIG. 4), or vis versa, with the thumb of that hand.

Another feature of the new clips 2 is the free running, untwisted manner in which they ride on the outrigger lines 18 (see FIG. 1) even when the outriggers may flex violently in rough seas. Thus, the arrangement of the roller means 20 relative to the body 6 continuously provides a substantially friction-free fairlead for the fishing line 4 regardless of the fact that the outrigger from which the upper support line 18 is suspended may be in relatively violent motion due to sea conditions.

Further, the V-shaped roller 36 functions to maintain the fishing line 4 in a centered position completely out of contact with any portion of the clip 2 other than the roller 36. Hence, the line 4 is not subjected in any manner to fraying or snagging which occurs in some prior art devices because of substantial friction between fishing lines and parts of outrigger clips.

The embodiments of the invention in which an exclusive property or privilege is claimed are defined as follows:

1. An outrigger clip for releasably holding a fishing line in trolling position astern a fishing boat comprising:
    an elongated body having a blind longitudinal bore extending through each end thereof,
    fastener means on each of said body ends for supporting said outrigger clip outboard of said boat on outrigger lines,
    roller means over which said fishing line may freely run for holding said line in trolling position, and
    tension means for controlling the releasing of said holding of said fishing line,
    said roller means comprising:
        a gate portion having a hinged end and an unhinged end,
        said hinged end being pivoted on the midsection of said body about an pivot axis substantially parallel to the longitudinal axis of said body to permit said roller means to swing between a fishing line holding position and a fishing line release position, a shaft extending from an outboard end of said gate portion normal to said pivot axis, a V-shaped roller rotatably retained on said shaft and a lug extending from the same side of said gate portion as said shaft at an acute angle relative to said gate portion and said shaft.

2. The outrigger clip of claim 1 wherein said tension means comprises:

detent members to frictionally engage said lug when said roller means is in said holding position, a spring held in each of said longitudinal bores to apply a biasing force on said detent members, and screw members carried in said bores for controlling the magnitude of said biasing force applied by said springs.

3. The outrigger clip of claim 2 wherein said tension means comprises a cavity in said body which said lug enters when said rollers means is in said holding position.

4. The outrigger clip of claim 3 wherein said cavity has a pair of opposed sidewalls defined by the blind ends of said bores.

5. The outrigger clip of claim 4 wherein said detent members consist of balls captured in said blind ends with a portion only of each ball extending through its respective sidewall into said cavity.

6. The outrigger clip of claim 5 wherein said screws members are threaded into said longitudinal bores.

7. The outrigger clip of claim 6 wherein said springs are compressed against said balls by said screw members.

8. The outrigger clip of claim 1 wherein said fastener means are bails pivoted on each end of said body.

9. The outrigger clip of claim 1 wherein said lug is integral with said gate portion.

10. The outrigger clip of claim 9 wherein said lug has a cross-section defined in part by a pair of plane first surfaces and a pair of plane second surfaces, said first surfaces being longer than said second surfaces.

11. The outrigger clip of claim 10 wherein one of said first surfaces intersects one of said second surfaces at a predetermined angle and the other of said first surfaces intersects the other of said second surfaces at a predetermined angle.

12. The outrigger clip of claim 11 wherein said first surfaces define between them an angle.

13. The outrigger clip of claim 2 wherein said detent members comprise spring pressed balls and said lug engages said balls when said roller means is in said holding position, said engagement providing predetermined force for releasably retaining said roller means in said holding position.

14. The outrigger clip of claim 13 wherein first surfaces of said lug momentarily engage said balls as said roller means swings from said releasing position to said holding position.

* * * * *